Feb. 24, 1953 W. KOENIG, JR 2,629,779
SIGNAL TRANSMISSION SYSTEM
Filed April 12, 1944
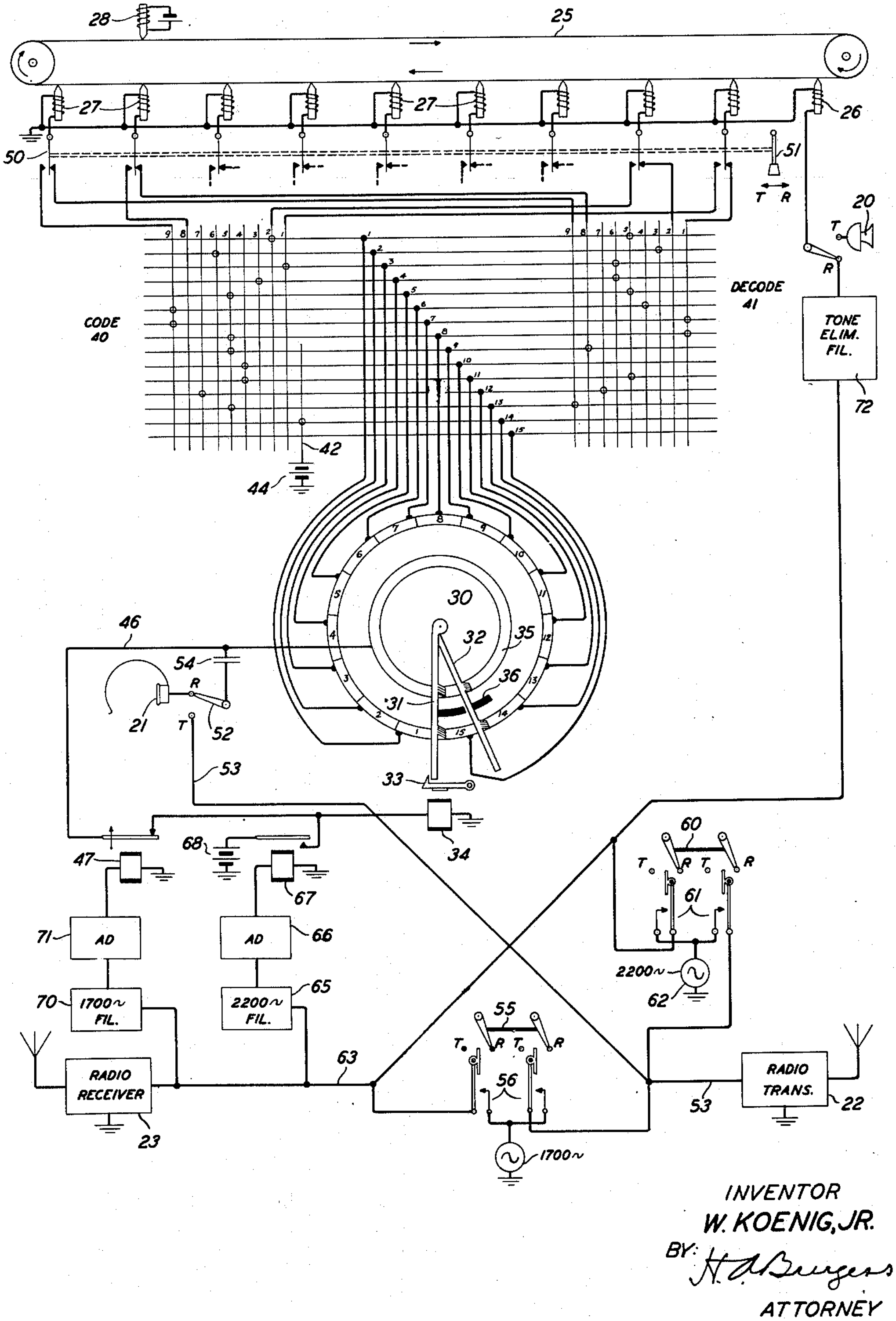
INVENTOR
W. KOENIG, JR.
BY: H. A. Burgess
ATTORNEY Patented Feb. 24, 1953 2,629,779

UNITED STATES PATENT OFFICE 2,629,779

SIGNAL TRANSMISSION SYSTEM

Walter Koenig, Jr., Clifton, N. J., assignor to Bell Telephone Laboratories, Incorporated, New York, N. Y., a corporation of New York Application April 12, 1944, Serial No. 530,686

12 Claims. (Cl. 179—1.5)

The present invention relates to the transmission of speech or other signals with privacy.

The invention has particular application to the type of privacy in which a commutator or distributor is used to divide the speech or signal on a time basis into short fragments and a telegraphone tape or other delay device is used for variably delaying the different signal elements so that they are transmitted out of their natural sequence. The number of fragments into which the signal is subdivided in the time of rotation of the commutator is determined by the number of commutator segments and if the scheme of connection to the commutator segments remains the same, the signal fragments are sent out with the same scramble in each rotation of the commutator. If a start-stop distributor is used, the start impulse gives a possible clue to the number of signal fragments sent in each rotation of the distributor.

It would add to the difficulty which an outsider would have in attempting to decode the signal if the number of commutator segments could be varied from time to time so as to vary the number of code elements. It would further add to the difficulty of unauthorized decoding if a start pulse is not transmitted in each rotational period so that the eavesdropper is unable to determine from a start pulse the number of elements in the code that is being used.

The present invention provides a system in which the number of commutator segments used per rotation of the distributor can be readily varied. In accordance with a further feature of the invention, provision is made for eliminating the need of a start pulse in each rotation of the distributor.

The nature and objects of the invention and its various features will be more clearly understood from the following detailed description when read in connection with the attached drawing, the single figure of which shows in schematic form a circuit and apparatus that would be used at one terminal of a two-way telephone privacy system.

Referring to the drawing, a speech transmitter is shown at 20 and a speech receiver is shown at 21 for enabling two-way conversation to be carried out between the station shown and a distant station over the radio link comprising radio transmitter 22 and radio receiver 23. The radio link is chosen for illustration since the privacy system to be disclosed is adapted for use on airplanes or other moving vehicles or as a portable system generally. However, the apparatus indicated in the drawing can equally well be adapted for transmission over a line wire if desired.

A number of transmit-receive (TR) switches are shown at various points in the drawing and it is assumed that these would all be operated in unison by a push-to-talk button (not shown) on the telephone instrument. These switches could, for example, be under the control of relays, the energizing circuits of which are closed by such a push-to-talk button. The normal position of all of these switches is the R position shown. When talking, these switches are thrown to the T position indicated.

The system shown and described herein is of the general type disclosed in F. G. Buhrendorf, Serial No. 450,418, filed July 10, 1942, Patent No. 2,406,349 granted August 27, 1946, to which reference may be made for many of the details that are omitted from the present disclosure for simplicity of illustration.

The telegraphone tape for introducing delay into the signals is shown at 25 and is driven in the direction of the arrows past a recording coil 26 and, in this case, nine reproducing coils 27 spaced at equal distances along the tape. An erasing coil is shown at 28.

The commutator is generally indicated at 30 and is shown as comprising fifteen segments, this number being arbitrary. The commutator is provided with two brushes 31 and 32 and a single stop member or latch 33 which may be tripped by latch magnet 34. Each brush arm bridges over whatever segment the brush is resting on and a solid ring 35. Each brush has an insulating extension 36 on its backward side so that when either brush is against stop 33 the other brush is stopped by extension 36 so that the brush comes to rest on the next preceding commutator segment. By operating the latch 33 momentarily, the leading brush is allowed to proceed but the second brush is stopped when it arrives at the latch. Both brushes frictionally engage the driving shaft by suitable frictional clutches so that they are caused to rotate at a constant speed when released but are held stationary in the manner above described while the drive shaft continues to rotate.

Connected between the reproducer coils 27 and the commutator segments are two code boxes 40 and 41 each comprising a set of nine vertical conducting bars to which the coils 27 may be connected and a set of fifteen horizontal bars connected respectively to the fifteen distributor segments. As in the Buhrendorf disclosure, these sets of bars are arranged so that a perforated code card may be inserted between them and so that spring contactors or fingers (not shown) connect certain of the vertical bars with certain of the horizontal bars as determined by the perforations in the code card. The code box 40 is used for determining the transmitting code, while code box 41 is used to determine the receiving code or the decode. The code box 40 has an additional short vertical bar 42 extending across horizontal buses 9 to 15 inclusive, and permanently connected to battery 44.

In the apparatus as shown and thus far described, codes varying in lengths from eight elements to fourteen elements can be used. The eight element limitation comes from the fact that a brush beginning at segment No. 1 must traverse more than half a revolution for the shortest code that is used. The fourteen element limitation comes from the fact that one segment must be reserved in addition to the last segment used by the code in order to start the cycle repeating. It is obvious that any suitable number of distributor segments can be used, thus permitting a wide variation in the code lengths available.

It will be noted that if brush 31 is released from latch 33 to start its rotation, the wiring to the horizontal bars of the code boxes is such that connection is made to the horizontal bars by the brush in the order 1, 2, 3, etc., counting from the top downwards. If the punching in the code cards is such that only the first eight horizontal bars are used, the brush after passing off distributor segment 8 and traversing segments 9 to 15, inclusive, has no connection to any of the coils 27. If brush 32 is released so as to start traversing distributor segment No. 1 as soon as brush 31 passes off segment No. 8 to segment No. 9, the same coils 27 are brought into the circuit and in the same order as occurred by the passage of the previous brush 31 over these same segments 1 to 8. By the time brush 32 has reached segment No. 9, brush 31 is again against stop 33 in readiness to be released for rotation.

The manner in which the brushes are released during the running condition of the distributor is as follows: A punching is made in the code card to connect vertical bar 42 to the horizontal bar in the code box 40 immediately below the last horizontal bar used by the particular code. For example, if an eight element code were used, the punching of the code cards would be such as to connect vertical bar 42 to horizontal bar No. 9. When either brush reaches segment 9, therefore, battery is applied from 44 over bar 42 and bus 9 to segment 9 and by way of the brush to ring 35 and conductor 46, normal contact of relay 47, winding of latch magnet 34 to ground, thus releasing the brush which is at the time held against the stop 33. The time of releasing of the stopped brush is, therefore, determined by the time of arrival of the rotating brush on the next distributor segment after the last one used by the particular code. The punchings indicated by the circles at the intersecting points are for a thirteen element transmitting code and a thirteen element receiving code, each of which is the converse of the other. Therefore, the perforation which governs the operation of the latch magnet appears on horizontal bar No. 14.

If it were not for concealing the start pulse in each revolution, a source of tone could be connected in place of battery 44 and arranged not only to operate the local latch magnet but to transmit a tone pulse to the distant station or stations to operate the latch magnet or magnets at those stations. Such operation is contemplated by the present invention. However, in order to illustrate the feature of concealing the start pulse so as to give no clue to the length of code being used, the drawing illustrates circuits by which each station when once started at the beginning of a talk period in a given direction is run under local control from battery 44 as just described.

In the idle condition, when neither party is talking, both brushes 31 and 32 are stopped in the position indicated in the drawing. (The manner in which the brushes at all stations are brought to rest will be indicated presently.) Assuming the station indicated in the figure is to be used for talking, all of the TR switches are thrown from the normal R position to the T position resulting in the following circuit changes. The microphone 20 is connected to the recording coil 26 so that when speech is spoken into the microphone a record is made on the traveling tape. The ganged switches 50 are all thrown to the left or T position by the button 51 (or by suitable relay, if desired). The switch 52 is thrown to disconnect receiver 21 and to connect lead 53 to lead 46 by way of condenser 54 thus connecting ring 35 to the input of radio transmitter 22. A pair of switch levers 55 are thrown to the left but produce no electrical effect because the contacts 56 are arranged to be closed momentarily only when these switch levers are thrown from the T to the R position. Switch levers 60 in moving from position R to position T momentarily close both switches 61 thus connecting a source of oscillations 62 to both conductors 63 and 53. Switches 61 again open as levers 60 move past the tripping levers on the upper ends of the switch springs. Oscillator 62 generates a suitable tone in the upper part of the speech band and for illustration this is assumed to have a frequency of 2200 cycles. This short spurt of 2200-cycle tone is sent out over the radio transmitter 22 to the distant station and is also applied over conductor 63 to the input of a narrow band filter 65 which is selective to 2200 cycles. This tone is rectified and amplified at 66 and causes operation of relay 67 which attracts its armature and connects battery 68 to latch magnet 34 thus releasing brush 31 at the local station. The tone that is transmitted to the distant station or stations comes in at the radio receiver 23 at such stations and is selected by filter 65 thereat to cause operation of the start relay 67 at those stations in the same manner as at the local station. In this way the distributor brushes at all stations are started at the same instant by the pressing of the push-to-talk button at whichever station is about to transmit. The start relays 67 are energized only for a sufficient length of time to insure full operation of latch magnet 34 after which they immediately release so as to allow the latch 33 to catch and stop the trailing brush 32. Thereafter and as long as the push-to-talk button remains depressed, the brushes at each station are placed under the control of battery 44, and the constancy of speed of the driving mechanism is relied upon to maintain synchronism during the talking period.

When the talking period ends, the push-to-talk button is released and the TR switches all return to their R position indicated in the drawing. The switch 60 in shifting to the R position does not close contacts 61 but passes over the tripping mechanism indicated on these switch springs. Switch levers 55, however, in passing to the R position momentarily close switch springs 56 and apply a spurt of tone of, in this case, 1700 cycles to the radio transmitter 22 over conductor 53 and to the filter 70 over conductor 63. Filter 70 selects this tone and applies it through amplifier detector 71 to the operating winding of slow release relay 47 causing that relay to open at its back contact the energizing path from battery 44 to latch magnet 34. Due to the slow release characteristic of relay 47 this circuit remains open long enough to allow the brushes to come to rest against latch 33 as shown in the drawing. The 1700-cycle tone sent out over the radio transmitter comes in on each of the radio receivers of the distant stations and is selected by the filter 70 at those stations to operate the stop relays 47 and bring the brushes to rest at each of those stations. All stations are now assumed to be in the normal or receiving condition with the brushes of all distributors stopped.

If one of the distant stations starts to talk, the brushes are released by the 2200-cycle tone spurt received over radio receiver 23 of the station shown and through filter 65, this tone operating start relay 67 in the manner already described. The output lead 63 of radio receiver 23 is now connected by way of a tone eliminating filter 72 and TR switch to recording coil 26 for recording the received scrambled speech on the tape 25. The reproduced speech in the coils 27 is now carried to the decode box 41 since gang switches 50 are in their right-hand or receiving positions. By prearrangement between the parties the proper code card has been inserted in decode box 41 to decode the received message. The message elements rearranged in normal order are transmitted through segments of the distributor and the active brush to ring 35, condenser 54 and into the receiver 21. When the distant talking party releases his push-to-talk button, the spurt of 1700-cycle tone is transmitted to the system, is received in radio receiver 23, selected by filter 70, and actuates stop relay 47 causing the brushes at all stations to come to rest.

The condenser 54 is for the purpose of attenuating the battery pulse used for energizing magnet 34 and preventing transients from going out over the radio transmitter. While the simple condenser 54 has been indicated for this purpose, a network may be found necessary in practice. The tone eliminating filter 72 may be a suppression type filter for introducing high attenuation at two points in the speech band, namely, at 1700 cycles and 2200 cycles in order to attenuate the tone waves below distributing level.

What is claimed is:

1. In a signal privacy system, a line, means to introduce different amounts of delay in the signals to be sent, means comprising a rotary distributor for selectively transmitting to the line in successive time intervals fragments of the signal that have been delayed by respectively different times, said distributor having two brushes and means causing them to sweep over a fractional number of distributor segments one after the other in such manner that each brush passes off the last of said segments at the instant the other brush is starting to traverse the first of said segments, and means for enabling each brush to transmit said signal fragments only during the part of its rotation in which it is passing over said fractional number of segments.

2. In a privacy system, a line, a plurality of devices for individually varying a characteristic of a signal wave, a rotary distributor for connecting said devices to said line in given order to send coded signal currents, means permitting use of a variable number of the distributor segments to vary the number of signal elements sent in one distributor cycle comprising two brushes rotatable over the distributor segments, and means controlled by one brush after it has traversed a given number of distributor segments to start the other brush on its travel over said given number of segments.

3. In a privacy system for signals, a transmission circuit, a plurality of devices for individually modifying a characteristic of a signal wave, a rotary distributor having a segmented ring and two brushes rotatable over said ring, means to connect said devices in circuit with different fractional portions of the total number of segments in said ring, means to cause one brush to traverse the segments contained in said fractional portion, and means controlled by the passage of said one brush beyond the last of said segments to start the other brush traveling over said same segments, said brushes being electrically connected to said circuit.

4. In a privacy system, a distributor having segments and two brushes traveling over said segments, means to alter a characteristic of signal waves, a code box having changeable contactors for connecting said means to different numbers of segments of said distributor at different times to provide different lengths of code in which said signals are to be sent or received, and means controlled by one brush after it has traveled over those distributor segments to which connection is made by said code box to start the other brush traveling over the same segments.

5. In a privacy system for transmitting signals in code, a rotary distributor for dividing the signals into short fragments, switching means for determining a particular angular portion of the distributor, less than the whole, that is to be used in any one distributor cycle, a pair of independently driven brushes, means to stop each brush in position to start to travel over the particular portion of the distributor that has been determined for use while the other brush is traveling over said portion, and means controlled by each brush in passing off said particular portion to start the other brush traveling over said portion.

6. The invention claimed in claim 5 including means for setting up a special potential condition on the initial part of that portion of the distributor immediately following the particular portion that has been determined for use, said means to stop each brush comprising a stop member, a release magnet therefor, and means controlled by said potential condition by way of the traveling brush for energizing said release magnet.

7. The invention claimed in claim 5 including means for setting up a special potential condition on the initial part of that portion of the distributor immediately following the particular portion that has been determined for use, said means to stop each brush comprising a stop member, a release magnet therefor, means controlled by said potential condition by way of the traveling brush for energizing said release magnet, said system including also a contact momentarily actuatable at the conclusion of a signal period, and means operable by said contact for disabling the means controlled by said potential to prevent the energization of said release magnet.

8. In a privacy system for transmitting signals in code, a rotary distributor having a segmented ring for dividing signals into short fragments, two brushes adapted to traverse said distributor ring with given angular displacement between said brushes, code determining means for variably controlling said angular displacement to vary the code length, and means controlled by said code determining means for rendering operative, for signal dividing purposes, only the portion of said distributor ring of angular extent equal to said angular displacement.

9. The invention according to claim 8 including means for stopping each brush in position to start traversing said portion of said distributor ring while the other brush is traveling over said portion, and means to release the stopped brush at the instant the traveling brush has completed its travel over said portion.

10. The invention according to claim 8 including means to stop both brushes when the system is idle, and means to start one only of said brushes over said portion of the distributor ring in response to initiation of signal transmission.

11. The invention according to claim 8 including means to stop both brushes when the system is idle, means to start one only of said brushes over said portion of the distributor ring in response to initiation of signal transmission, comprising means to send a start pulse over the system in response to initiation of signal transmission, and means to send a stop pulse over the system in response to cessation of signal transmission.

12. In a telephone privacy system, separated stations, means at both stations for coding speech waves including a rotary distributor having a segmented ring for dividing the speech waves into short fragments for transmission or reception, each distributor having two brushes adapted to traverse said distributor ring with given angular displacement between brushes, code determining means for variably controlling said angular displacement to vary the code length, means local to each station during a talking interval for stopping and starting each brush once per rotation at a fixed point on the ring to cause the brushes at all stations to travel over a used portion of the ring, less than the whole, in step with each other entirely under local station control, means operating in response to cessation of a talk transmission period from any station to send a stop pulse to all stations to stop the brushes at all stations, and means operating in response to initiation of speech transmission from any station to send a start pulse to all stations to start one of the brushes at each station to travel over the used portion of the distributor ring at such station.

WALTER KOENIG, Jr.

REFERENCES CITED

The following references are of record in the file of this patent:

UNITED STATES PATENTS

| Number | Name | Date |
|---|---|---|
| 1,416,765 | Vernam | May 23, 1922 |
| 1,657,366 | Belin | Jan. 24, 1928 |
| 1,709,901 | Espenschied | Apr. 23, 1929 |
| 1,726,578 | Nyquist | Sept. 3, 1929 |
| 1,752,485 | Hartley | Apr. 1, 1930 |
| 1,981,114 | Mitchell | Nov. 20, 1934 |